United States Patent [19]

Choquet et al.

[11] Patent Number: 4,761,646
[45] Date of Patent: Aug. 2, 1988

[54] METHOD AND SYSTEM FOR ADDRESSING AND CONTROLLING A NETWORK OF MODEMS

[75] Inventors: Michel Choquet, Vence, France; James B. Staton, III, Heidelberg, Fed. Rep. of Germany; Kenneth R. Swartz, Apex, N.C.

[73] Assignee: International Business Machines Corporation, Armonk, N.Y.

[21] Appl. No.: 864,998

[22] Filed: May 20, 1986

[51] Int. Cl.⁴ .................... H04Q 9/00; H04J 3/00
[52] U.S. Cl. .................. 340/825.520; 375/8; 370/13
[58] Field of Search ............ 340/825.52, 825.02; 371/22; 375/8, 10, 81; 370/13, 92; 379/106, 107, 442, 29

[56] References Cited

U.S. PATENT DOCUMENTS

| | | | |
|---|---|---|---|
| 4,112,414 | 9/1978 | Iscol et al. | 371/22 |
| 4,385,384 | 5/1983 | Rosbury et al. | 375/10 |
| 4,387,440 | 6/1983 | Eaton | 364/434 |
| 4,419,751 | 12/1983 | Cholat-Namy et al. | 370/13 |
| 4,477,898 | 10/1984 | Cholat-Namy | 370/92 |
| 4,523,322 | 6/1985 | Abbiate | 375/81 |
| 4,549,302 | 10/1985 | Heatherington | 375/8 |

OTHER PUBLICATIONS

S. Huon et al. "Network Problem–Determination Aids in Micro–Processor–Based Modems", IBM J. Res. Develop., vol. 25, No. 1, Jan. 1981, pp. 1–16.

Primary Examiner—Donald J. Yusko
Attorney, Agent, or Firm—Edward H. Duffield

[57] ABSTRACT

A DTE can control the modems attached thereto by transmitting command messages over the data path and analyzing report messages supplied by the modems in return. Each command message is identified by a specific header. A command message intended for a remote modem (34) is intercepted by the local modem (30) and reformatted so as to obtain a supervisory message that is then transmitted at the rate of one bit per baud. A command message intended for a remote multichannel modem (48) is transmitted either by means of a supervisory message or in the data mode of operation. Messages are specifically addressed to individual modems by a special heirarchical address which utilizes information of the network link level on which the desired modem resides together with information as to which terminal (DTE), if any, the desired modem is attached. All locally attached primary modems are assigned an address comprising the link level designation and a first constant. All remotely attached primary modems are assigned an address comprising their link level designation and the first constant. All secondary modems are assigned an address comprising their link level designation and a second constant or, in the event they serve an attached terminal (DTE), the DTE address is used instead of the second constant.

6 Claims, 9 Drawing Sheets

FIG. 11A
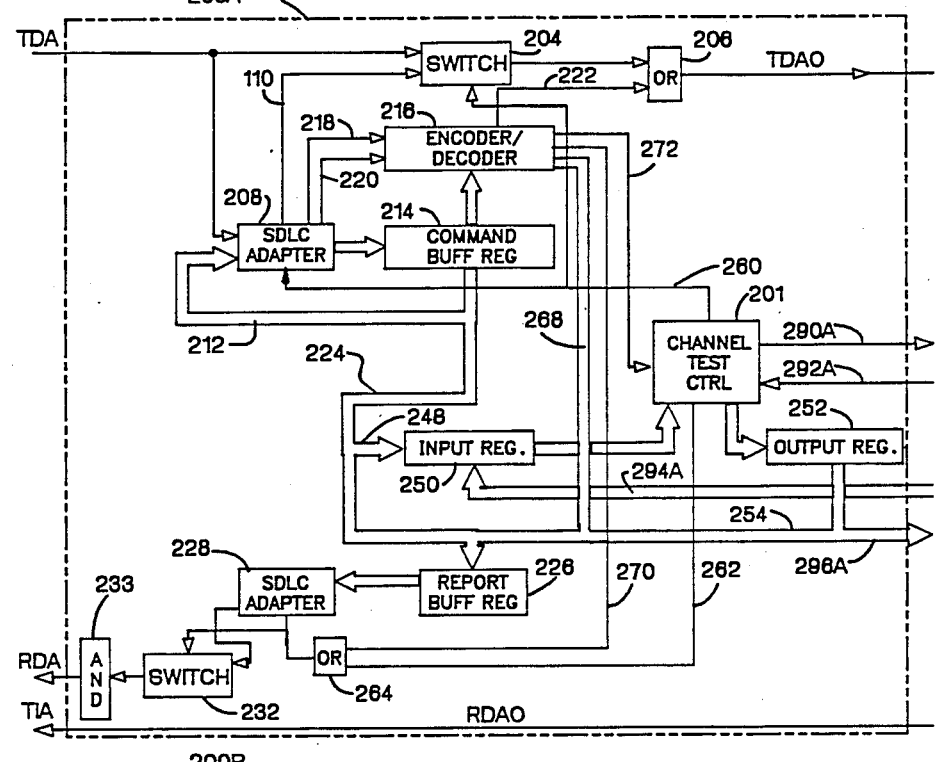
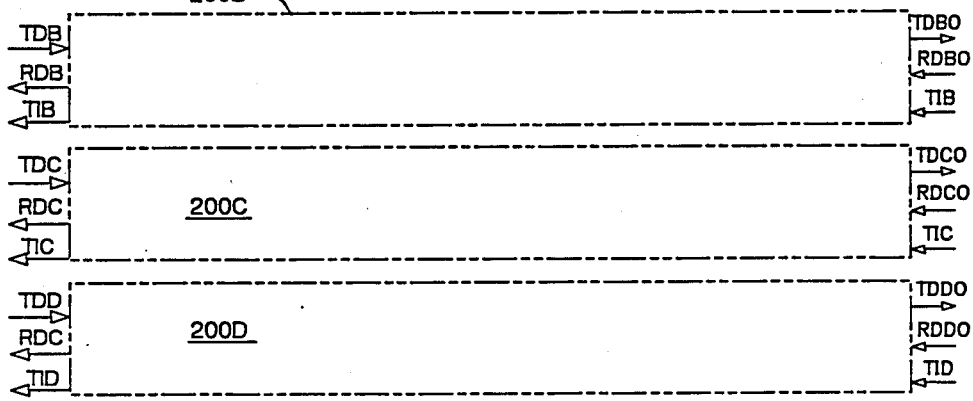

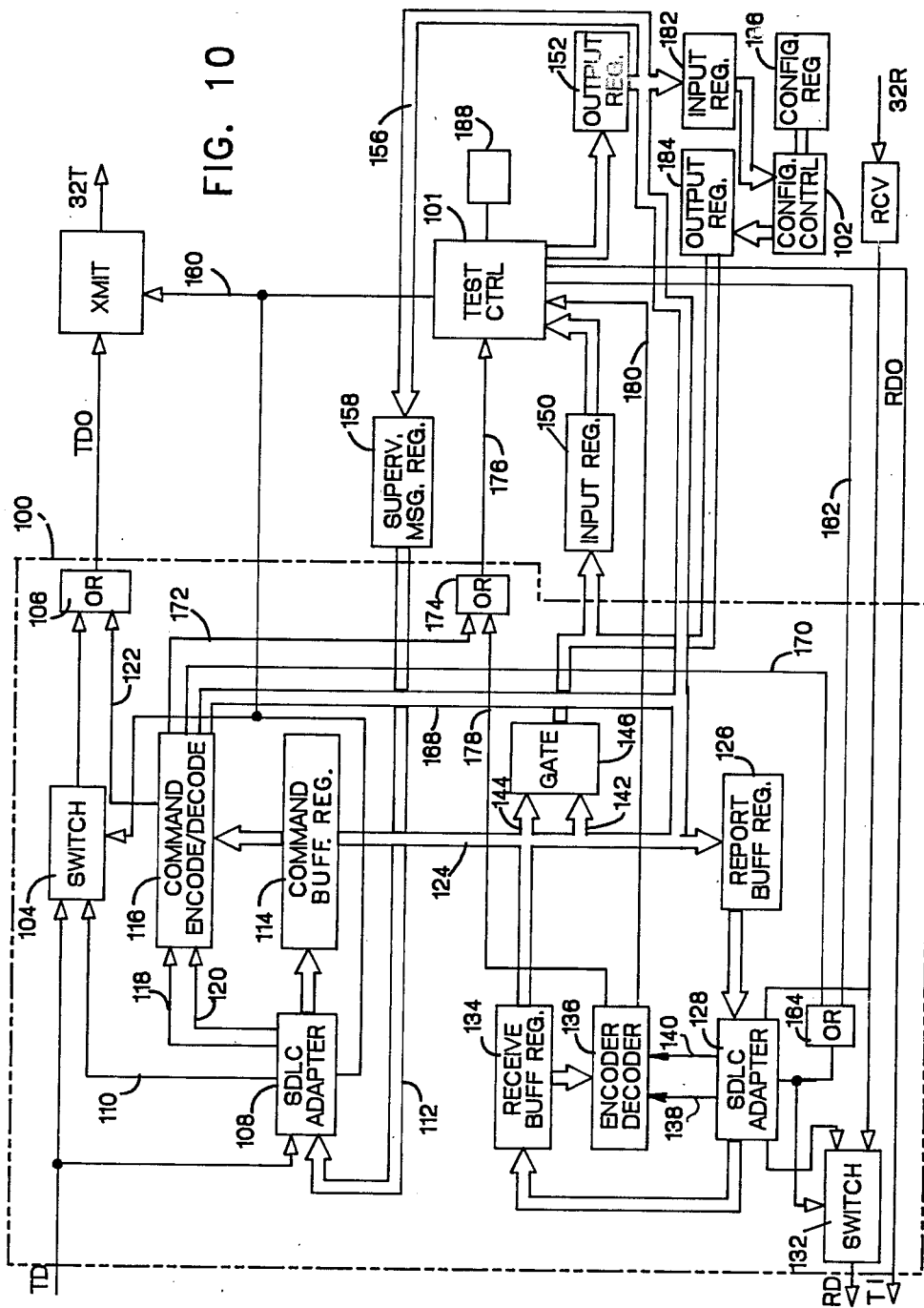

METHOD AND SYSTEM FOR ADDRESSING AND CONTROLLING A NETWORK OF MODEMS

RELATED APPLICATIONS

This application is closely related to the co-pending, commonly assigned application Ser. No. 855,255 which describes the specific modem embodiment and the network control protocol and method used in the present invention.

FIELD OF THE INVENTION

This invention relates to data transmission systems and, more particularly, to a method and apparatus for addressing and controlling a network of modems.

PRIOR ART

There is presently a growing demand for large telecommunication networks of the type including numerous modems. This demand has previously been met through technological advances and the standardization of data exchange protocols. However, the ever increasing size and complexity of modem networks is limited by the means for managing these large networks. For example, it is always necessary to measure network performance, to identify problems, and to reconfigure or redefine the arrangement of connections in the networks.

One of the problems encountered in controlling the modems is that the modems are normally transparent to the signals received from the data terminal equipment (DTEs) connected thereto. To solve this problem, several prior art techniques exist. An article by S. Huon and R. Smith entitled "Network Problem-Determination Aids in Microprocessor-Based Modems", appearing in the IBM Journal of Research and Development, Vol. 25, No. 1, January 1981, describes a modem link control system wherein a DTE can control a local modem attached thereto by activating a specially provided interface line, TC, to cause that modem to switch out of the transparent mode to the test mode. then, by sending the modem a test command over the Transmit Data (or TD) line in the interface, the modem can be given instructions or commands for execution. If the test command is intended for the local modem, then that modem will perform the test and send the results to the DTE over the Receive Data (or RD) line in the interface. Alternately, if the test command is tended for the remote modem that communicates with the local modem, then the local modem will interrupt all transmissions to the remote modem and send a signal at a so-called service frequency that will cause the remote modem to go to the test mode. Then the local modem will send the test command from the DTE to the remote modem at a so-called service rate. A disadvantage of this approach is that the DTE-modem interface must include a TC lead even though the modems used in a network may be of different manufacture that may not incorporate such a TC lead. Further, its implementation in a large network comprising multilevel links would raise a number of problems since, in this approach, a modem can only go to the test mode if the TC lead is activated or if the above-mentioned signal at the service frequency is received and propagation of such a signal through digital nodes is most cumbersome as well.

U.S. Pat. No. 4,385,384 describes a control system for a modem network wherein the test commands are sent over the line through a secondary frequency channel dedicated to this specific purpose. In addition to necessitating one secondary channel per modem, this control system, being primarily designed for the transmission of data over analog lines, is unsuited to complex networks in which data must pass through digital nodes.

U.S. Pat. No. 4,112,414 describes a control system that can be used in a network including modems in which test commands are sent over the communication line in the same fashion as ordinary addressed commands to terminals or the like. Each modem or test device incorporated in a modem is to be given its own address which is used to disconnect any further downstream devices at the addressed modem to provide for an element by element testing capability to locate a faulty device. This requires assigning addresses to modems or test devices which reduces the addressability of the overall system data terminals by consuming available addresses. This is a significant problem in large networks where system address assignments are at a premium. In addition, no provision is made to prevent the inadvertent triggering of the test units or modems into the disconnect mode of operation for downstream devices due to the inadvertent aliasing of the address in the data stream, i.e., the address that is assigned may occur in the random sequence of data bits and trigger the device into operation when it is not intended to do so. This is extremely disruptive and cannot be tolerated in an effective communications network.

U.S. Pat. No. 4,387,440 addresses some of the problems inherent in the previous patent noted in that alias protection for the addresses that are assigned to the modems is incorporated by requiring a special escape code to appear prior to the modem being put into the test mode which disconnects all further downstream devices. The escape code would presumably be selected to minimize the chance of inadvertent occurrence of the code in random data but will not effectively eliminate the possibility. Further, the technique employed is only effective on locally connected modems, i.e., those which are connected directly to the controller since the device switches out of communication with any further downstream devices and thus cannot effectively be utilized in the network without assigning specialized escape codes to each modem in the network. This would be a cumbersome and extremely difficult system to implement and does not alleviate the problem of aliasing.

Yet another patent attempting to address this issue is U.S. Pat. No. 4,549,302 in which an escape code like that in a previously noted patent is utilized but in which the escape code must be repeated after a specified time delay period to assure that it is a valid escape code, i.e., not an aliasing one. This approach is somewhat less sensitive to inadvertent aliasing of the escape code in transmitted data but is extremely time consuming and disruptive to the system and cannot be effectively utilized in a network of modems without assigning different codes to each modem which has the unfortunate effect of eliminating numerous codes from use in the normal data stream.

OBJECTS OF THE INVENTION

In light of the foregoing difficulties with the known prior art, it is an object of this invention to provide an improved addressing and control technique for modems in a network that requires no particular control leads in the modem to DTE interface, but utilizes for the passing of commands to the modems, the same path utilized by the data stream and which does not require a specialized escape code for each modem and which permits duplication of modem address assignments on various lines and does not require using up the available system unit addresses to assign addresses individually to the modems.

A further object of the invention is to provide an improved hierarchical addressing and control scheme for modems in a data network in which addresses for the modems can be automatically generated according to the position in the network occupied by a modem and utilizing an address of its attached DTE terminal, if any.

It is an object of this invention to overcome the foregoing difficulties and to provide an improved method and system for addressing and controlling a modem network that requires no particular leads in the DTE-modem interface and in which the commands follow the same paths as the data, thereby enabling the invention to be used in large networks comprising both analog and digital links.

The foregoing and other objects, features and advantages of the invention not specifically enumerated will be apparent from the following more particular description of the preferred embodiment of the invention, as illustrated in the accompanying drawings.

BRIEF SUMMARY

The present invention provides an improved method of addressing and controlling a modem network comprising at least a controlling DTE (Data Terminal Equipment) such as a communications controller like the IBM 3725, for example, at least a first modem attached thereto, and a second modem attached to the first by means of a transmission medium which may be either a leased line or a dial-up connection. Messages are sent from the DTE to the first modem along the same path as data. The message comprises a special identification sequence or means H that eliminates the possibility of inadvertent aliasing of a command message by the appearance of a random stream of data that happens to match to such a low degree of probability that inadvertent occurrence is extremely remote. The message also comprises an improved hierarchical address for the individual modems which is configured in two bytes of data in which the first byte defines the communication level or link level of the modem to which a command is to be sent and the second byte identifies the specific modem at that level either by a first constant which identifies all primary modems at that level, or a second constant, which identifies all secondary modems on that level, or by the DTE address to which a secondary modem is attached if a specific modem is sought. Primary modems are defined to be those at the end of a communication link closest to the communication controller or, on a lower level link, the modem on that level link which is closest in the network data stream path to the controller even though other upstream intervening modems on a higher link level. Each link level will thus have a primary and a secondary modem and the links may be cascaded together with level 1 being closest to the communication controller, level 2 being connected to level 1 at its secondary modem output and so forth.

In the improved addressing and control scheme as embodied in the present invention, each modem has an address that does not require the assignment of a separate system address which would deplete the pool of available possible addresses. The link level byte constitutes the first portion of the modem address and either a first or a second constant to identify primary modems on the level or secondary modems on the level or the DTE address to which the modem is attached at the remote end is used to identify the specific modem. The use of the identification header means in combination with the hierarchically assigned addresses can provide a message format that passes in the normal data channel through both digital and analog switching and control means, which does not require the assignment of new system addresses, and which is immune to aliasing and false triggering. Furthermore, the individual addresses assigned to modems can be automatically generated based upon the physical hierarchical position of where the modem lies in the network and to what DTE, if any, it is attached.

BRIEF DESCRIPTION OF THE DRAWINGS

FIG. 10 is a block diagram illustrating an exemplary embodiment of a modem incorporating the invention.

DESCRIPTION OF THE INVENTION

Figure 1:
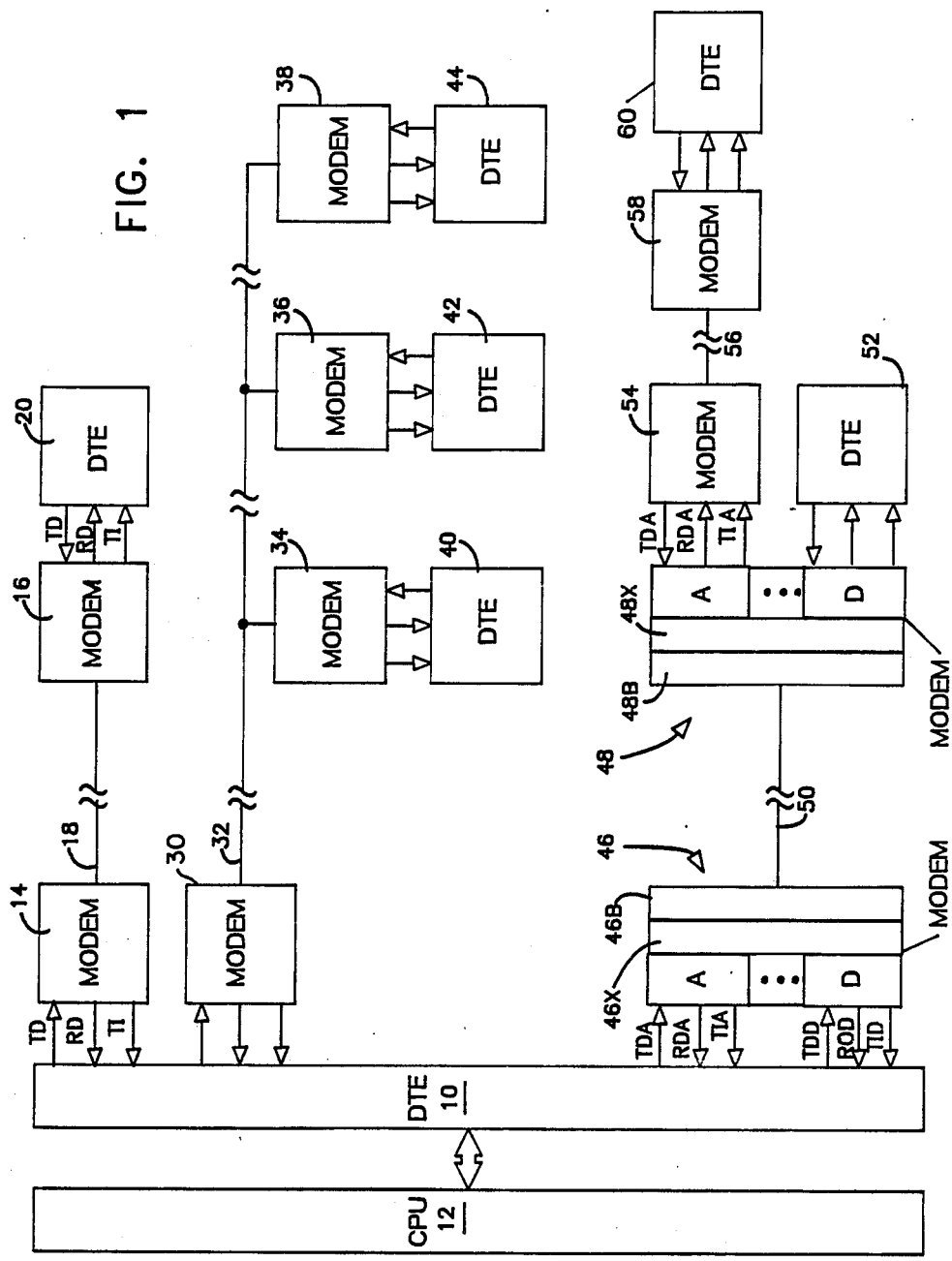
FIG. 1 is a block diagram of a modem network in which the invention may be used.

Referring now to FIG. 1, a block diagram of a typical modem network which may incorporate the invention is shown. A central DTE 10, which may be, for example, an IBM 3725 Communications Controller, is attached to a central processing unit 12, such as an IBM 3081 CPU. The controller or DTE 10 is also connected to a network of modems which may comprise different types of communications links, three of which are shown by way of example. Namely, these links are: a point-to-point link, a multipoint link and a two-level link comprising multichannel modems. The central DTE 10 may of course consist of a network node controller. The point-to-point link includes a local modem 14 directly attached to the central DTE 10 and communicating through a transmission line 18 with a remote modem 16 directly attached to a DTE 20. The multipoint link includes a local primary modem 30 directly attached to central DTE 10 and communicating through a common transmission line 32 with several remote secondary modems shown in FIG. 1. These are shown as blocks 34, 36 and 38 directly attached to three respective DTEs 40, 42 and 44. The two-level link includes a local multichannel modem 46 whose channels are directly connected to central DTE 10 and which communicates with a remote multichannel modem 48 through a line 50. In the example shown in FIG. 1, each of modems 46, 48 is conventionally provided with four channels, A-D, a multiplexing/demultiplexing device, and a base modem, respectively designated 46X, 48X and 46B, 48B. The remote multichannel modem 48 has its channel D directly connected to a DTE 52, while its channel A is connected to a remote primary modem 54 and its other two channels are connected to devices or modem links not shown. Modem 54 communicates through a line 56 with a remote secondary modem 58 directly connected to a DTE 60. Each of modems 14, 16, 30, 34, 36, 38, 54 and 58, and each channel of modems 46 and 48 is connected to the central DTE or to another DTE or to another modem through a CCITT V24 interface. For simplicity, each interface is shown as comprising three lines respectively designated Transmit Data (TD), Receive Data (RD) and Test Indicator (TI). The three lines associated with channels A-D are designated TDA, RDA, _ The format of the command messages is as follows:

F, A, N, H, I, AM, C, §P¶, FCS, F where:
F=SDLC frame delimiter (1 eight-bit type='7E')
A=SDLC address field (1 byte='FD')
N=SDLC command field (1 byte='1B')
H=Command header informing the modem that a command message will be received next. (8 bytes='05 10 42 08 21 84 10 42')
I=2-byte identifier to be described later.
AM=Hierarchical Modem address field used in the present invention. (2 bytes)
This field contains the address of the modem that is to intercept the command message, and that of the modem for which the message is intended.
C=Command code. (1 byte). Different values of this code will be described later.
§P¶=Command parameters. This is an optional field serving to complement the command byte as necessary.
FCS=SDLC frame check sequence field. (2 bytes)
In the above description, the single quotation marks (' ') indicate a value given in hexadecimal notation.
Identifier I in the command message is two bytes long, as follows:
Byte 0

| L | M | C | S | R | E | O | O |
|---|---|---|---|---|---|---|---|
| 0 | 1 | 2 | 3 | 4 | 5 | 6 | 7 |

Bit 0 (L): Test mode.
When 1, this bit specifies a test mode in accordance with the invention.
Bit 1 (M): Command transmission mode.
This bit is solely used with multichannel modems to indicate the manner in which a command is to be transmitted from a local modem to a remote modem.
When 0: Supervisory Mode transmission. This mode is specific to the invention and will be described later.
When 1: Data Mode transmission.
Bit 2 (C): Command/Report.
When 0: Command.
When 1: Report.
Bit 3 (S): System information.
When 0: Command generated by the central DTE to cause statistical data to be collected.
When 1: Command generated by the central DTE upon detecting a failure in the link.
Bit 4 (R): Initial Command/Repeated Command.
When 0: Initial command.
When 1: Command repeated by the DTE.
Bit 5 (E): Command repetition enable
When 0: The local modem is enabled to repeat a command if the remote modem involved failed to respond to the original command or if an erroneous report was received.
When 1: Repetition of the command is not allowed.
Bits 6 and 7: maintained at zero.
Byte 1
Reserved for future use.
The command code is one byte long and its content is as follows:

| O | O | G | | N | | | |
|---|---|---|---|---|---|---|---|
| 0 | 1 | 2 | 3 | 4 | 5 | 6 | 7 |

Bits 0 and 1: Maintained at zero.
Bits 2 and 3 (G): Command group.
When 01: Problem determination commands.
When 01: Operational commands.
Bits 4 to 7 (N): Command identification number.
0000 to 1111: This number identifies the command. A partial list of commands is given below by way of example:
local self-test,
remote self-test,
status of local/remote modem,
status of link,
status of local/remote DTE interface,
line analysis,
read local/remote configuration,
write local/remote configuration, etc.
The format of the report messages is as follows:

F, A, N, L, K, I, AM, C, §P¶, SB, D, FCS, F where:
F=SDLC frame delimiter (1 byte='7E')
A=SDLC address field (1 byte='FD')
N=SDLC command field (1 byte='1B')
L=Length field (1 byte)
This field specifies the number of 8-bit bytes in the report message.
K=Key (1 byte='50')
This byte indicates that the next data are a response to a command from a modem.

I=Message identifier, to be described later. (2 bytes)
AM=Hierarchical Modem address as defined above. (2 bytes)
Retransmission of field AM of the command message.
C=Command code (1 byte)
Retransmission of field C of the compound message.
§P¶=Command parameters
Retransmission of field §P¶ of the command message.
SB=Detection byte (1 byte)

This byte contains a return code that is significant if an exception condition occurred while detecting or executing the command. Such codes may indicate, for example, that:

the command message was too long and could not be decoded; or that the received command message included an erroneous FCS, causing the command message to be retransmitted by the DTE; or that the execution of the command would necessitate the use of a device that is not installed; etc.

D=Data field (0 to n bytes)

This field contains the report from the modem that intercepted the command and/or the report from the modem that executed the command.

FCS=SDLC frame check sequence field (2 bytes)

Identifier I in the report message is two bytes long, as described below:

Byte 0:

| L | M | C | E | R | O | O | O |
|---|---|---|---|---|---|---|---|
| 0 | 1 | 2 | 3 | 4 | 5 | 6 | 7 |

Bit 0 (L): Test mode
　When 1, this bit specifies a test mode in accordance with the invention.
Bit 1 (M): Command transmission mode
　This bit is solely used with multichannel modems and specifies the manner in which a command is to be transmitted from a local modem to a remote modem.
　When 0, this bit specifies a Supervisory Mode transmission.
　When 1, it specifies a Data Mode transmission.
Bit 2 (C): Command/Report
　When 0: Command.
　When 1: Report.
Bit 3 (E): Exception condition
　When 0, this bit indicates that the command has been correctly executed and that a data field follows. The detection byte is set to zero.
　When 1, an exception condition has occurred. The nature of the exception is indicated in the detection byte.
Bit 4 (R): Retransmission
　When 0, this bit indicates that no retransmission has been performed by the modem.
　When 1, the bit indicates that the command message has been retransmitted by the local modem.
Bits 5-7: These bits are maintained at zero.
Byte 1
　Reserved for future use.
(For simplicity, field §P¶ will be omitted from the various messages discussed hereafter.)

GENERAL DESCRIPTION

The network modem addressing and control method of the invention will now be described in general terms with reference to FIG. 1.

Control by DTE of a Modem Attached Thereto

Figure 2:
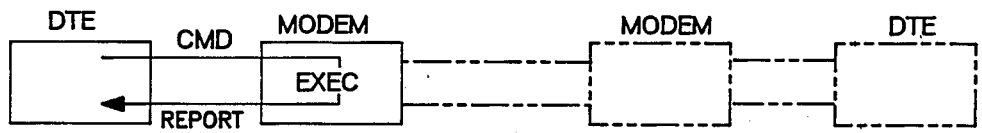
FIG. 2 is a schematic diagram illustrating the path followed by the messages to enable a modem to be addressed and controlled by the DTE to which it is attached.

A DTE, such as the central DTE 10, controls an attached modem, such as modem 14, by sending thereto over the Transmit Data (TD) line a command message of a type called local command message. This message is in the format described earlier. Upon receiving header H in the SDLC frame received from the TD line, the modem determines whether its address is contained in the modem address field AM. If it is not, the modem ignores the content of the message; if it is, the modem intercepts and stores the command message, and sends forced 1 bits over the transmission line. The modem then checks the validity of the command message (format, command byte, parameters, FCS, etc). If the message is found to be invalid, the modem generates a report message to identify the reasons for the invalid condition, inserting the appropriate code in detection byte SB, and sends the message to the DTE over its Receive Data (RD) line. If the command message is valid, the modem executes the command specified by the message, generates a report message and sends it to the DTE over its RD line. This type of control of a modem is schematically shown in FIG. 2.

Control of a Remote Modem

A DTE, such as the control DTE 10, controls a remote modem, such as modem 34, by sending to local modem 3 connected to modem 34 a command message of a type called remote command/supervisory mode, whose format has been described earlier, over the TD line. Upon detecting header H in the SDLC frame received over the TD line, local modem 30 determines whether its address is contained in modem address field AM. If it is not, the modem ignores the content of the message; if it is, the modem intercepts and stores the command message, sends forced 1 bits over the transmission line and checks the validity of the message (format, command byte, parameters, FCS, etc). If the message is found to be invalid, the modem generates a report message identifying the causes of the invalidity and sends it to the DTE over its RD line. If the command message is determined to be valid, local modem 30 constructs a so-called supervisory message and sends it over the transmission line in a mode called supervisory mode. The format of the supervisory message carrying the command message is as follows:

F, SH, I, AM, C, FCS, F

Field SH is a supervisory header used to identify supervisory messages. It has a length of one byte and contains the following information:
Bit 0: Speed
　When 0: Backup speed
　When 1: Nominal speed
Bit 1: Repetition
　When 1, the modem that receives this message interrupts all transmissions over the line, then retransmits the supervisory message.
Bit 2: Cancellation of loss-of-carrier indicator
　When 1, the modem that receives this message ignores any loss-of-carrier indication therein.

Bit 3: Test mode
When 1, this bit indicates a test mode in accordance with the invention.
Bit 4: Origin of command
When 0: DTE.
Bits 5-6: Unused.
Bit 7: When 1, the supervisory message is stored by the modem for which the command message is intended.

The contents of fields I, AM, C are identical to those of corresponding fields of the command message intercepted by local modem 30.

The supervisory mode of transmission is as follows: the modem interrupts all transmissions over the line, then sends a conventional startup sequence (TS) of the type described in CCITT Recommendations V27 and V29. The startup sequence is sent in a conventional manner, exactly as if it preceded a data message, and as indicated, for example, in said CCITT Recommendations. The supervisory message is sent at the rate of one bit per baud time, regardless of the speed at which modems 30 and 34 communicate with each other. For example, if two modems communicate at a nominal speed of 9600 bps in accordance with Recommendation V29, with the baud rate being 2400 bauds and four data bits being transmitted every baud time, the supervisory message will still be sent at the rate of one bit per baud time. This type of transmission, while slow, ensures a much more reliable reception of the supervisory message by the modem to which it is sent. When transmission of the supervisory message is completed, the local modem can send data is a conventional manner and at the desired speed.

Upon receiving a startup sequence, the remote modem 34 switches to a speed of one bit per baud time at the end of the sequence to determine whether a supervisory message, as indicated by a supervisory header, is present. Any such message, if detected, is stored by the remote modem 34 for analysis. The modem then determines whether its address is contained in address field AM. If it is not, modem 34 ignores the content of the message; if it is, modem 34 checks the validity of the command message (format, command byte, parameters, FCS, etc.). If the message is found to be invalid, the modem supplies a report message identifying the reasons therefor and sends it to the local modem as part of a supervisory message transmitted in the supervisory mode. If the command message is valid, modem 34 executes the command specified by the message and generates both a report message and a supervisory message containing the report message. The format of such a supervisory message is as follows:

F, SH, I, AM, C, DR, FCS, F

The contents of fields I, AM and C are the same as those of the corresponding fields of the received supervisory message, and field DR contains the report from the remote modem. The supervisory/report message is sent to local modem 30 in the supervisory mode.

Figure 3:
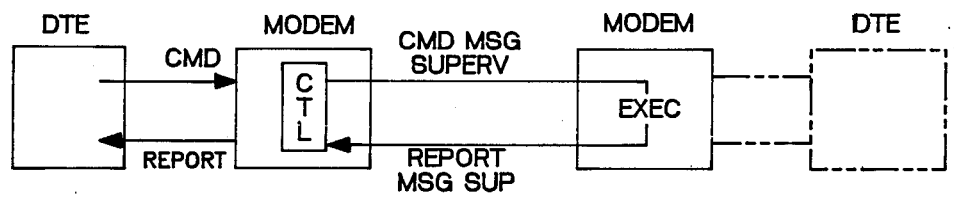
FIG. 3 is a schematic diagram of the path of the "remote command/supervisory mode" type of messages.

If no supervisory message containing a report message is received within a predetermined time interval and if the logic level of bit 5 (E) in the identifier of the command message received from the DTE does not allow the command to be repeated, then local modem 30 provides a report message indicating "no report received". If an erroneous supervisory message is received from the transmission line and if the logic level of said bit 5 (E) does not allow the command to be repeated, then local modem 30 generates a report message indicating an "erroneous report" condition. If no supervisory message containing a report message is received within a predetermined time interval, or if an erroneous supervisory message is received from the line while the logic state of said bit 5 (E) does allow the command to be repeated, then local modem 30 resets bit 5 and retransmits the supervisory message. If a supervisory message containing a report message and no errors is received within the prescribed time interval, then local modem 30 generates a report message from the report message received from the remote modem and transmits same to the DTE over its RD line. This type of control of a remote modem is schematically shown in FIG. 3.

Control by DTE of a Multichannel Modem Attached Thereto

Figure 4:
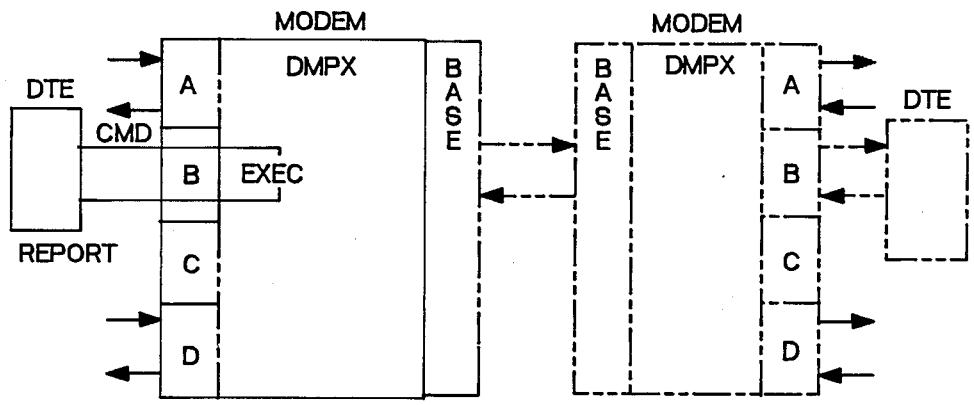
FIG. 4 is a schematic diagram of the path of "local command" messages involving a single channel of a multichannel modem.

A DTE, such as central DTE 10, controls all channels (A-D) of the multichannel modems attached thereto, say, multichannel modem 46, or the base modem in the multichannel modem, by means of command messages of the local command type. Each channel A-D monitors the train of bits received from its TD line. Upon detecting header H in a received SDLC frame, a channel determines whether the address of multichannel modem 46 is contained in modem address field AM. If it is not, the channel ignores the content of the message; if it is, the channel intercepts and stores the command message, and transmits forced 1 bits to the remote multichannel modem. The channel then checks the validity of the command message (formate, command byte, parameters, FCS, etc). If the message is found to be invalid, the channel provides a report message identifying the reasons for the invalid condition and sends it to the DTE over its RD line. If the command message is valid, the command is decoded. At this stage, it may be found that the command solely concerns the channel, or that it relates to the base modem. If the former, the channel executes the command, supplies a report message and sends it to the DTE over its Rd line. This type of control of a modem is illustrated in FIG. 4.

Figure 5:
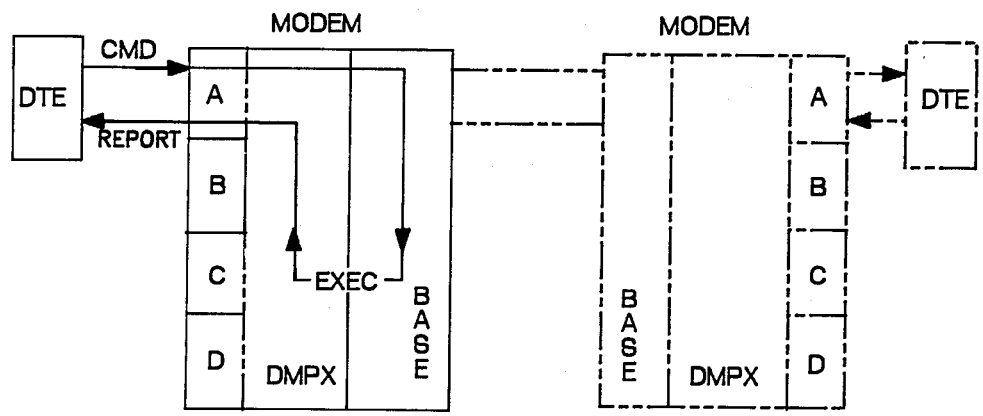
FIG. 5 is a schematic diagram of the path of "local command" messages involving the base modem in a multichannel modem.

If the command involves the base modem, the channel transfers the command message thereto and waits for a report message. The command is executed in the base modem, which generates a report message and sends it to the channel. The channel then sends the report message to the DTE over its RD line. This type of control of a modem is illustrated in FIG. 5.

Control of a Remote Multichannel Modem

A DTE, such as the central DTE 10, controls all channels of the remote multichannel modems attached thereto, for example the channels A-D of multichannel modem 48, or the base modem 48B of remote modem 48, by means of remote command/supervisory mode or of remote command/data mode types of messages. Each channel A-D of multichannel modem 46 monitors the train of bits received over its TD line. Upon detecting header H in a received SDLC frame, a channel determines whether the address of multichannel modem 46 is contained in the modem address field (AM). If it is not, the channel ignores the content of the message; if it is, the channel intercepts and stores the command message, and transmits forced 1 bits to the remote multichannel modem 48. The channel then checks the validity of of the command message (format, command byte, parameters, FRC, . . . ). If the message is found to be invalid, the channel; provides a report message identifying the reasons for this condition, and sends same to the DTE over its Rd line. If the command message is found to be valid, the command is decoded. There are two possibilities at this stage:

the command message is to be sent in the supervisory mode (bit 1 (M) of identifier I of the command message being logically 0); or the command message is to be sent in the data mode (bit 1 (M) being logically 1).

(1) Supervisory Mode Transmission of Command Messages

In this case, the channel transfers the command message to the base modem, which derives therefrom a supervisory message and sends it over the transmission line in the supervisory mode. The channel then waits for a report message from the remote modem 48. The supervisory sequence used here is similar to that used to exchange messages in links not involving multichannel modems, except for the fact that the supervisory message has been slightly modified as noted below. The format of the supervisory message that contains the command message, where multichannel modems are used, is as follows:

F, SH, CH, I, AM, C, FCS, F

The contents of fields SH, I, AM and C are identical to those of corresponding fields of the command message intercepted by the channel. Field CH contains an 8-bit byte specifying the address of the channel that received the command message. After transmitting the supervisory message, base modem 46B waits for a supervisory message containing the report message from remote multichannel modem 48. Upon receiving a startup sequence, modem 48 waits for the end of the sequence, then monitors the incoming train of bits to determine whether a supervisory message, as indicated by a supervisory header, is present. Such a message, if detected, is stored in modem 48 for analysis. If its address is not contained in the modem address field (AM), modem 48 ignores the content of the message; if it is contained in field AM, the modem checks the validity of the command message (format, command byte, parameters, FCS, etc). If the message is found to be invalid, the modem generates a report message identifying the reasons for this condition and transmits it over the line to local multichannel modem 46 by means of a supervisory message. If the command message is found to be valid, modem 48 decodes the command to determine whether or not it involves its base modem. If the command only involves a channel whose address is contained in field CH, the base modem transfers the command message to that channel. The channel then executes the command, provides a report message and transfers it to base modem 48B, which transmits it over the line by means of a supervisory message. If the command involves the base modem, the base modem executes the command and generates a report message which it then sends over the line by means of a supervisory message whose format is as follows:

F, SH, CH, I, AM, C, DR, FCS, F

The contents of fields SH, CH, I, AM and C are identical to those of corresponding fields of the received command message, and field DR contains the report from the remote modem. The supervisory message is sent in the supervisory mode to local modem 46 within a supervisory sequence similar to that received from the local modem.

Figure 6:
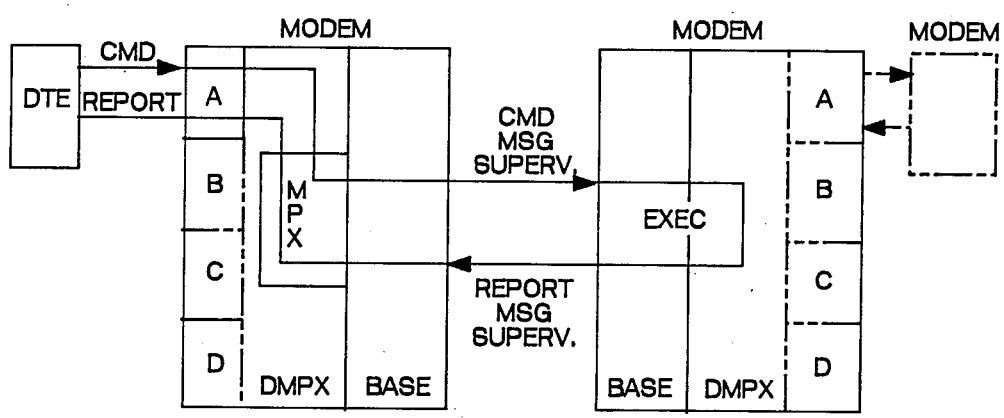
FIG. 6 is a schematic diagram of the path of "remote command/superisory mode" messages for a multichannel modem.

At local multichannel modem 46, if no report message is received within a predetermined time interval and if the logic level of bit 5 (E) in the identifier of the command message from the DTE does not allow the command to be repeated, the base modem generates a report message indicating "no report received". If an erroneous supervisory message is received over the line and if the logic level of said bit 5 (E) does not allow the command to be repeated, the base modem generates a report message indicating an "erroneous report" condition. If no report message is received within a predetermined time interval, or if an erroneous supervisory message is received over the line while the logic level of bit 5 (E) does allow the command to be repeated, the base modem resets that bit 5 and then retransmits the supervisory message. If a supervisory message containing a report message and no errors is received within the prescribed time interval, the base modem generates a report message based upon the received supervisory message and transfers it to the channel whose address is contained in field CH for transmission to the DTE over its RD line. This type of control of a remote multichannel modem is illustrated in FIG. 6.

Figure 7:
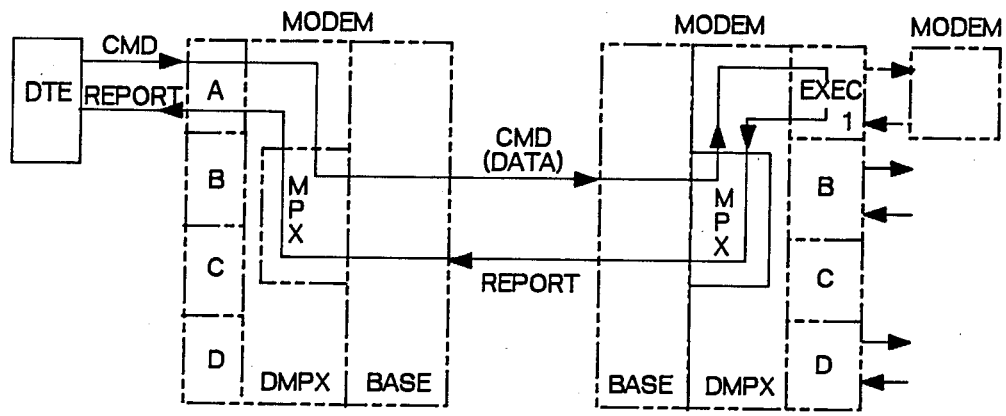
FIG. 7 is a schematic diagram of the path of "remote command/data mode" messages for a multichannel modem.

(2) Data Mode Transmission of Command Messages

Where the command message intercepted by the channel is to be transmitted in the data mode, the channel transmits at the normal data rate the command message received in the train of data bits and waits for a report message from the remote modem. At the remote multichannel modem 48, each channel monitors the train of bits from base modem 48B. When a channel detects header H, it determines whether the address of modem 48 is contained in modem address field AM. If it is not, the channel ignores the content of the message; if it is, the channel intercepts and stores the command message, and transmits forced 1 bits over its RD line. The channel then checks the validity of the command message (format, command byte, parameters, FCS, etc). If the message is found to be invalid, the channel supplies a report message identifying the reasons for this condition and transmits it over the line in the data mode. If the command message is valid, the command is decoded. If the command only relates to the channel, the channel executes the command and provides a report message which it then transmits over the line in the data mode. If the command relates to base modem 48B, the channel transfers the command message thereto and waits for a report message therefrom. The command is executed in the base modem, which generates a report message and transfers same to the channel for transmission over the line in the data mode. This type of control of a modem is illustrated in FIG. 7.

Control of Second-Level Modems in a Two-Level Link

Figure 8:
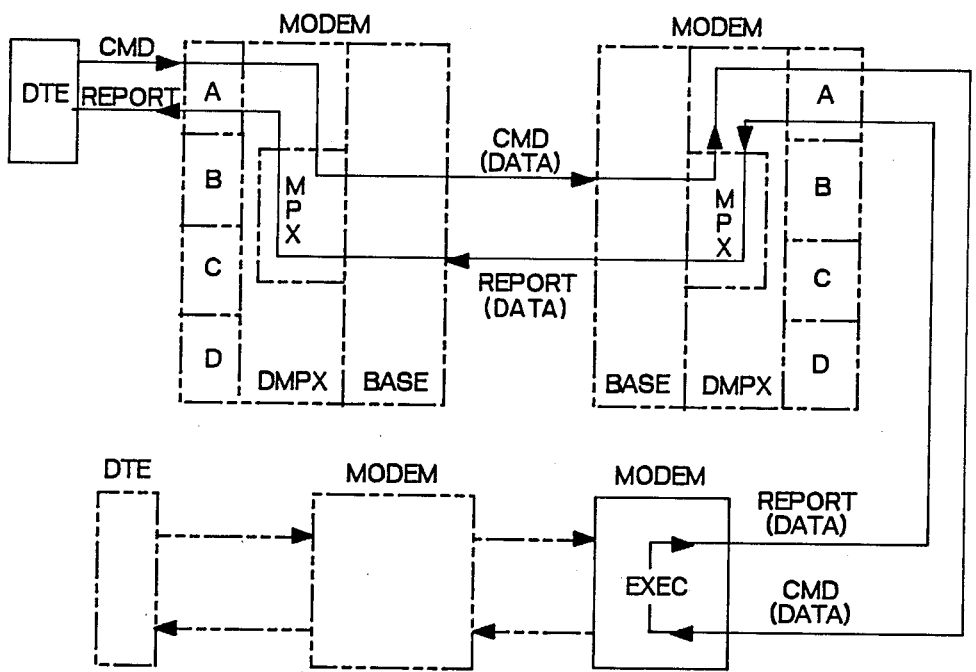
FIG. 8 is a schematic diagram of the path of messages in the instance of a command intended for a remote primary modem in a two-level link.

The second-level modems in a two-level link, for example modems 54 and 58 connected to channel A or multichannel modem 48, can be controlled as follows. Remote primary modem 54 connected to channel A of modem 48 is controlled by DTE 10 as briefly described hereafter and as shown in FIG. 8. DTE 10 transmits over channel A in the data mode a command message of the local command type that contains the address of remote primary modem 54, but not the addresses of modems 46 and 48. Accordingly, neither of modems 46 and 48 will intercept the command message, which will be received directly by modem 54 and processed by that modem in the same manner as if it were directly attached to DTE 10. Modem 54 will respond to the command by sending a report message to DTE 10 through channel A.

Figure 9:
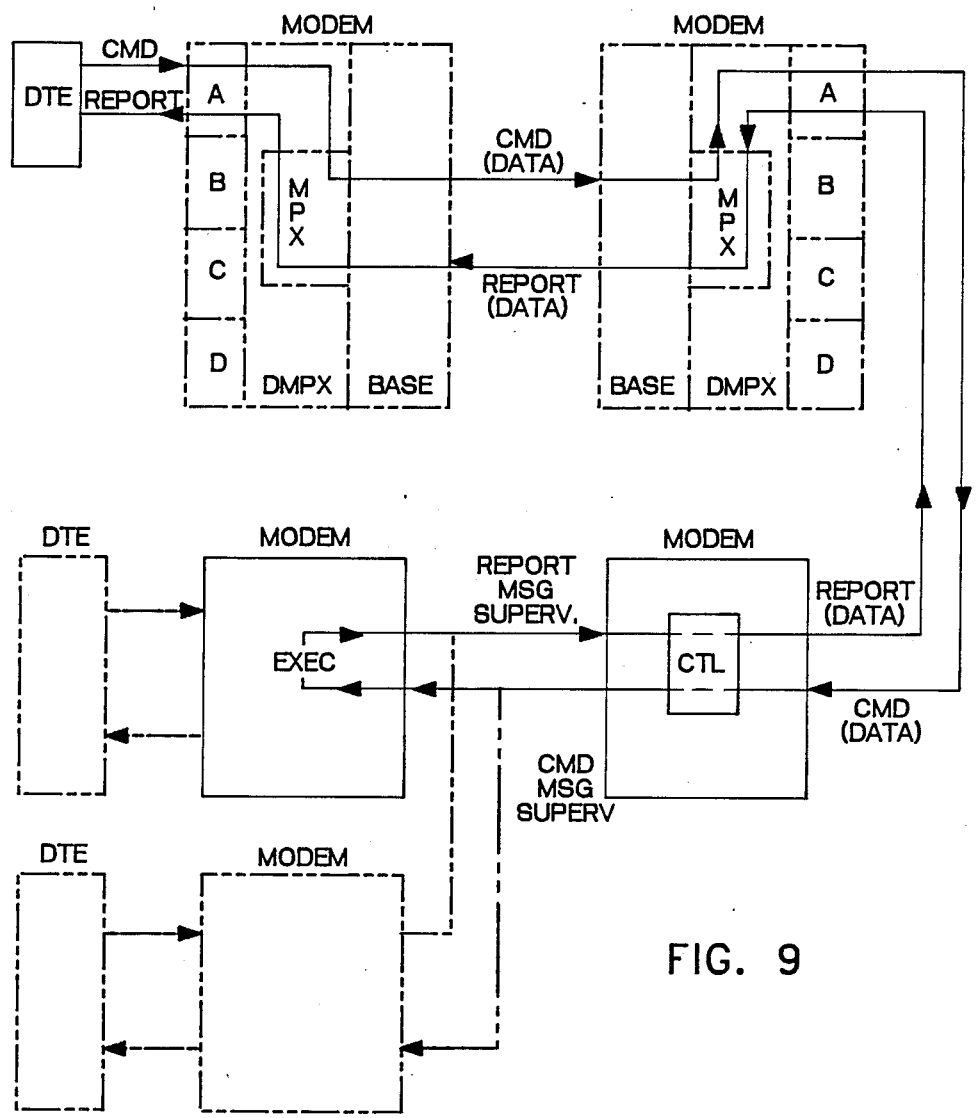
FIG. 9 is a schematic diagram of the path of messages in the instance of a command intended for a remote secondary modems in a two-level link.

Remote secondary modem 58 connected to channel A of modems 46 and 48 is under the control of DTE 10 as briefly described below and as illustrated in FIG. 9. DTE 10 transmits over channel A in the data mode a remote command/supervisory mode type of command message containing the addresses of remote modems 54 and 58, but not those of modems 46 and 48. Consequently, neither of modems 46 and 48 will intercept the command message, which will be received directly and intercepted by remote primary modem 54. The message will be processed in the same manner as it would have been by modem 30. If valid, the command message will have its format changed by modem 54 into a supervisory message that will be transmitted to the remote secondary modem in the supervisory mode. Upon receiving a report message from modem 58, modem 54 will generate a report message and transmit it to DTE 10 through channel A.

DETAILED DESCRIPTION

The invention will now be described in detail by means of typical command and report message, referring initially to FIG. 10 which illustrates an exemplary embodiment of a modem incorporating the invention. Only those elements which are essential to the invention have been shown. The modem illustrated in FIG. 10 is mainly comprised of a test command interface contained within the dashed outline 100, a transmitter and a receiver shown as blocks respectively labeled XMIT and RCV, a test controller 101, and a configuration controller 102. Transmitter XMIT, receiver RCV and controllers 101 and 102 are widely used in modems, and only those components thereof which are necessary for a full understanding of the invention will be described below. Line TD is connected in test command interface 100 to one of the two inputs of a switch 104 whose output is applied to one input of an OR gate 106. The output of OR gate 106 is connected to a line labeled TDO which leaves the interface and is connected to the input of transmitter XMIT. Line TD is also connected to the serial input of a SDLC adapter 108 which has its serial output connected by a line 110 to the other input of switch 104, its parallel input connected to a bus 112, and its parallel output connected to a command buffer register 114. SDLC adapter 108 is a commercially available, conventional device that can operate either in the receive mode or in the transmit mode. In the receive mode, the SDLC adapter, upon detecting a frame delimiter denoting the start of a SDLC frame, removes the extra zeros from the train of bits being received, in accordance with SDLC rules, analyses the bytes of remaining bits until a delimiter indicating the end of a frame is detected, and then checks the Frame Check Sequence (FCS). In the transmit mode, the SDLC adapter generates the start-of-frame delimiter, inserts zeros in the train of bits to be transmitted, and then generates the FCS and the end-of-frame delimiter. Buffer register 114 is coupled to a command encoder/decoder 116 connected to SDLC adapter 108 by means of a validation line 118 and a non validation line 120, and whose output is connected to the other input of OR gate 106 by a line 122. Encoder/decoder 116 may consist of any binary encoder/decoder capable of selectively activating its outputs according to the content of command buffer register 114. The latter is coupled by a bus 124 to a report buffer register 126 whose output is connected to the parallel input of a SDLC adapter 128 identical to SDLC adapter 108. The serial input of SDLC adapter 128 is connected to a line labeled RDO which connects the output of receiver RCV to one of the two inputs of a switch 132 whose output is connected to line RD. The parallel output from SDLC adapter 128 is applied to a receive buffer register 134 coupled to an encoder/decoder 136 similar to encoder/decoder 116 and connected to SDLC adapter 128 by a validation line 138 and a non validation line 140. Bus 124 and the output of receive buffer register 134 are both connected by buses 142 and 144 to the inputs of a gate 146 whose output is applied via a bus 148 to the input register 150 of test controller 101. The output register 152 of test controller 101 has its output connected via buses 154 and 156 to report register 126 and to a supervisory message register 158. Test controller 101 has an output connected via a line 160 to transmitter XMIT, to the control input of switch 104, and to the transmit mode control input of SDLC adapter 108. Test controller 101 has another output connected via a line 162 to one of the two inputs of an OR gate 164 whose output is applied to the transmit mode control input of SDLC adapter 128 and to the control input of switch 132. Another output of test controller 101 is connected to line TI. Encoder/decoder 116 has an output connected via a bus 168 to report register 126, another output connected via a line 170 to the other input of OR gate 164, and another output connected via a line 172 to one of the two inputs of an OR gate 174 whose output is applied via a line 176 to test controller 101. Encoder/decoder 136 has an output connected via a line 178 to the other input of OR gate 174, and another output connected via a line 180 to test controller 101. The output from output register 152 of test controller 101 is applied to input register 182 of configuration controller 102, which is provided with an output register 184 and is connected to a configuration register 186. Test controller 101 is additionally connected to a clock 188.

Assignment of Heirarchical Addresses of Modems

Figure 12:
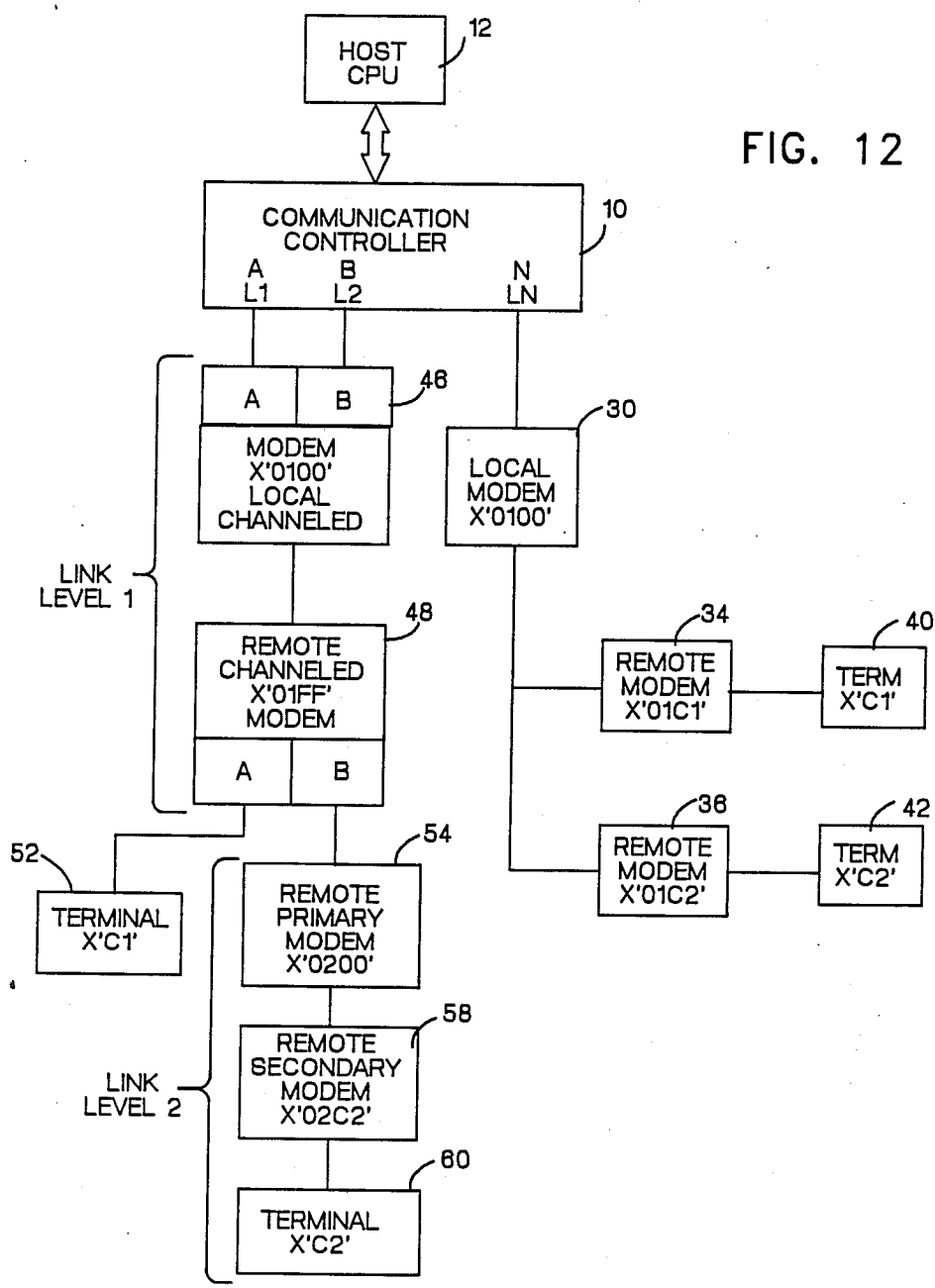
FIG. 12 is a schematic diagram of the hierarchical addressing scheme as employed in the preferred embodiment of the invention as used in a network of the type shown in FIG. 1, for example.

Turning to FIG. 12, a schematic diagram of a typical communication network similar to that shown in FIG. 1 is illustrated together with the link level designations and the functional names for the modems. Primary modems are defined to be the modems at the end of any link segment closest to the communications controller. In FIG. 12, for example, modem 46 is a local channelized modem and is a primary modem as it is at the end of its link, link level 1, closest to the controller 10. Modem 54 is a remote modem but is a primary modem for its link as it is located closest to the controller 10 for the link level number 2. It will be observed that the CPU 12 connects to the communication controller 10 which, in turn, manages the flow of data from the numerous communication lines L1–Ln to and from the CPU 12. The lines L1–Ln are designated a–n for simplicity.

Recalling that the modem address means AM as defined previously is utilized, the special structure of the modem addresses will be seen now to constitute an ordered pair of addresses. The first portion or first segment of the address is always assigned a hex value such as '01', '02', etc., which corresponds to the link level of the communications circuit. The second segment of the address is assigned one of three possible values. Either it is assigned '00' for a local modem, i.e., one attached to the controller or which acts as a primary modem at the end of a remote link nearest to the controller; or, if the modem is a remote modem on a switched line or if the controller wishes to address all modems in a broadcast mode, the second segment is selected as an arbitrary second constant 'FD'. Finally, if a specific modem attached to a DTE is to be addressed, the address of the DTE is employed as the second segment of the modem address.

It may be seen that the modem addresses are assigned based on the link level designation together with a first constant value for all locally attached primary modems. Addresses are assigned for all remotely attached primary modems based upon the link level designation and the first constant. All secondary modems are assigned an address comprising the link level designation and a second constant or, in the event they serve an attached DTE. the DTE address is used instead of the second constant. The constants are arbitrary and may be selected in any fashion so long as they are not given ambiguous meanings and allowed for other uses on a given communication line.

In the example shown in FIG. 12, the local channelized primary modem 46 is assigned an address with a hex value '01' constituting the first portion. Hex '01' corresponds to link level 1 as may be seen. The second portion of modem 46's assigned address is a first constant '00' designating the fact that this modem is a locally attched modem. Modem 54, to the contrary, is assigned an address with the first portion being '02' with a link level 2 designation on line B. The second segment of the address is assigned the first constant '00' since modem 54 is a primary or controlling modem for link level 2 on line B. Modem 58 is the remote secondary modem on line B and is assigned an address comprising the link level 02 and the address of its attached DTE 60, 'C2'.

Addresses of specific modems on a given communication line A, B, etc., may be duplicated so long as they are not duplicated in the same communication line. This means that the addresses are unique to a given communication line but may be used many times throughout a multi-line system. The addresses may be generated automatically by a communications controller given a configuration of the network utilizing the information of the addresses of any DTEs served and the link level designations of modems located in the communication system that serve DTEs therein.

Modem 46 in FIG. 12 is a channelized or multi-channel modem handling communication from lines A and B in the instance illustrated. The remote channelized modem 48 has an address that is assigned at '01' for its link level and any non-zero constant not employed for any of the other modems in that line. In the example illustrated, the second portion of modem 48's address is 'FF'.

Each modem in a communication line is required to look at both address segments to determine if a command is intended for it. In the example shown in FIG. 12, each modem has a unique address within its own communication line heirarchy which is based upon the position in the communication network filled by the modem and by its function, i.e., as a modem to serve a DTE or as a modem to serve as yet another attached modem. Automatic address generation in a communications controller 10 is therefore easily facilitated. All local modems on any line and any primary modems will have a line address comprising the link level and a second portion which is a first constant such as 00. All secondary modems will have an address comprising a link level and a second portion which may be either the DTE address or a second constant where it is desired either to address all remote modems in the network or any non-zero value not already assigned where it is desired to address a remote channelized modem such as modem 48 in FIG. 12.

Automated generation of the address pair portion is thus extremely simple. The first portion is assigned a link level '01' or '02' hex values in the example given for commands to a primary (local or remote) or to a tailed circuit, respectively, based upon link level designation. The second portion or segment of the address is assigned a second constant of one of two values, either '00' for a local modem command or 'FF' for a remote modem command. The system assigning addresses will then insert for 'FF' the DTE address where a DTE exists served by that modem or on a switched line the address 'FD' which is an alternative second constant. This constant is utilized since in dial-up networks the address of the specific remote modem is unknown and may change as different users come online.

Commands Received From DTE

In the data mode of operation, the data bits from the DTE to which a modem is attached are conventionally sent to that modem over the TD line. These bits travel through switch 104 and OR gate 106 and are then applied to the transmitter (XMIT) of the modem. In a known manner, the transmitter converts the data bits into analog signals suitable for transmission over the transmission line labeled 32T. The data bits from the DTE are also applied to SDLC adapter 108 which, unless a signal to the contrary has been generated, operates in the receive mode. Upon detecting a start-of-frame delimiter, SDLC adapter 108 eliminates the extra zeros from the train of bits being received, in accordance with the SDLC procedure, and loads the successive bytes of remaining bits in command buffer register 114. Upon detecting a command header, H, in the train of bits being loaded in buffer register 114, encoder/decoder 116 waits for the receipt of the modem address field, AM, of the command message and decodes the address contained therein. If field AM does not contain the address of the modem mentioned earlier, the command message is ignored. If it does, encoder/decoder 116 forces the output of OR gate 106 to a logical 1 value, thereby causing 1 bits to be produced by transmitter XMIT, then waits until SDLC adapter has determined whether the received command message is valid or invalid. In the latter case, SDLC adapter 108 supplies a high level over line 120 to encoder/decoder 116, which responds thereto by causing the contents of fields A, N, I, AM and C of the received command message previously stored in buffer register 114 to be transferred to predetermined positions of a report register 126; by generating a detection byte SB specifying that the received command message is invalid and a byte L specifying the number of bytes in the report message; and by loading said bytes SB and L into report register 126. At this time, register 126 contains the following report message:

A, N, L, K, I, AM, C, SB

Byte K, having a constant value of '50', is pre-loaded in report register 126. The report message contained in register 126 is then transferred to SDLC adapter 128, which goes to the Transmit mode upon receipt of an appropriate signal X1 sent by encoder/decoder 116 over line 170 and which generates a SDLC frame from the contents of report register 126 and transmits it over line RD to the DTE through switch 132, which is set to the appropriate position by signal X1. On the other hand, if the command message from the DTE is found to be valid, SDLC adapter 108 supplies a high level over line 118 to encoder/decoder 116, which responds thereto by supplying the test controller 101 of the modem via line 172 with a low level representative of a test request and by causing the contents of fields, A, N, I, AM, C of the received command message previously stored in buffer register 114 to be transferred to report register 126 and to the input register 150 of test controller 101. Upon detecting the test request signal, test controller 101 decodes command code C of the command message stored in input register 150. The command code may specify a local command, a remote command, or a local/remote command.

Local Commands

If the command code specifies a local command, test controller 101 causes the command specified by command code C to be executed and then loads the result, that is, the content of field D of the report message, into register 152. In addition, test controller 101 generates the contents of fields SB and L of the report message and loads them into register 152. The content of register 152 is then transferred to report register 126 which, at this time, contains the following report message:

A, N, L, K, I, AM, C, SB, D

This report message is then transferred to SDLC adapter 128 which is set to the transmit mode of operation by a signal X2 sent by test controller 101 over line 162 and which generates from the content of report register 126 a SDLC frame that is transferred to the DTE over line RD through switch 132. If the command code specifies a local configuration command, the test controller transfers the command message in register 150 to input register 182 of configuration controller 102 through its output register 152. Affter the configuration command has been executed, configuration controller 102 loads its report in its output register 184 whose content is transferred to test controller 101, which derives therefrom the report message and transmits it to the DTE as explained earlier.

For example, consider the type of local command termed "Local Self-Test". The command message that carries this command has the following format:

F, A, N, H, I, AM, '11', FCS, F where the command code '11' specifies a "Local Self-Test" command. The corresponding report message has the following format:

A, N, L, K, I, AM, '01', SB, D where field D, representative of the result of the execution of the command, includes the following byte:
 bit 0 0
 bit 1 Successful/Unsuccessful test
 bit 2 0
 bit 3 Coupler in error
 bit 4 Multiplexing device in error
 bit 5 0
 bit 6 Base modem in error
 bit 7 0

As another example, consider the type of local configuration command termed "Read Local Configuration", which is used to read the configuration of the local modem. The command message that carries this command has the following format:

F, A, N, H, I, AM, '25', CF1, . . . , CFn, FCS, F where the command code '25' specifies "Read Local Configuration", and where fields CF1, . . . , CFn specify the areas of the configuration register that are to be read out. Each of these fields is one byte long and can contain, for example, the following information:

| | |
|---|---|
| CF = | '40' Product description |
| | '41' Manufacturing description |
| | '42' Transmission speed |
| | '43' Base modem configuration |
| | '44' Multiplexing parameters |
| | '45' Alarm thresholds |
| | '46' Coupler parameters |
| | '47' Coupler description |
| | '4A' Stored telephone number |
| | '4B' Customer information |

The report message corresponding to this command has the following configuration:

A, N, L, K, I, AM, '25', SB, CF1, A1, D1, . . . CFn, An, Dn, FCS, F where D1, . . . Dn represent the contents of fields CF1, . . . CFn that have been read out, and A1, . . . , An are one-byte attributes of fields CF1, . . . , CFn. These attributes may contain the following codes:
 0 This field is applicable to the addressed modem, has been initialized and is valid.
 1 This field has not been initialized.
 2 The content of this field is invalid.
 3 This field necessitates an option that has not been installed.
 4 This field is not applicable to this modem.

Remote Commands/Supervisory Mode

If the command code specifies a remote command/supervisory mode (bit 1(M) of the identifier being zero), test controller 101 causes the contents of fields I, AM and C of the received command message to be transferred from input register 150 to supervisory message register 158 and generates supervisory header SH which it then loads into register 158 via output register 152. Test controller 101 then supplies transmitter XMIT with a Supervisory Mode signal X3 over line 160. In response thereto, XMIT stops transmitting data over the line, then starts transmitting a startup sequence TS. Switch 104 inhibits all communications between line TD and XMIT, and SDLC adapter 108 is set to the transmit mode of operation. The supervisory message in register 158 is sent to adapter 108 for conversion into a SDLC frame, which is then applied through switch 104 and OR gate 106 to XMIT to be transmitted at the rate of one bit per baud time by means, for example, of a differential biphase modulation technique. Test controller 101 initializes clock 188, which determines a timeout for a supervisory message containing a report from the remote modem. If no such message is received within the allotted time interval and if the logic level of bit 5 (E) of the identifier of the command message from the DTE, as stored in register 150, allows no repetition of the command, then test controller 101 prepares a "no report received" type of report message and loads that message into register 152, for subsequent transmission to report register 126 and the DTE, as has been explained. If no supervisory message is received within said time interval while said bit 5 (E) does allow the command to be repeated, then test controller 101 causes the supervisory message in register 158 to be retransmitted.

The signals received over transmission line 32R are fed to receiver RCV in which they are converted, in conventional fashion, into bits transmitted to the DTE through switch 132 over line RD. Upon detecting a startup sequence in the signals received over the transmission line, receiver RCV goes to a receive rate of one bit per baud time at the end of the startup sequence. Upon detecting a start-of-frame delimiter, SDLC adapter 128, which operates in the receive mode unless a signal to the contrary has been generated, removes all zeros from the train of bits being received and loads the successive bytes of remaining bits into the receive buffer register 134. After receiving a complete frame, encoder/decoder 136 decodes address field AM of the message contained in buffer register 134. If the address in field AM is not that of the modem, the received message is ignored; if it is, encoder/decoder 136 waits until SDLC adapter 128 has determined whether the message is valid or invalid. In the latter case, SDLC adapter 128 supplies a high level on line 140, and encoder/decoder 142 informs controller 101 accordingly by supplying a signal on line 180. Test controller 101 determines the logic level of bit 5 (E) of the identifier in the command message stored in register 150 and, if that level does not allow the command to be repeated, generates a report message denoting an "erroneous report" condition and stores it in register 152. This message is then transferred to report register 126 and to the DTE in the manner previously described. If the logic level of bit 5 (E) does allow the command to be repeated, controller 101 causes the supervisory message stored in register 158 to be retransmitted in the supervisory mode. If, on the other hand, the received message is determined to be valid, SDLC adapter supplies a high level on line 138, and encoder/decoder 136. For example, the command message that carries the "Remote Self-Test" type of remote command/supervisory mode has the following format:

F, A, N, H, I, AM, '19', FCS, F where command code '19' specifies the "Remote Self-Test" command. The format of the corresponding report message is given below:

A, N, L, K, I, AM, '19', DR.

Field DR is one byte long and is similar to field D of the report message associated with the "Local Self-Test" command.

Local/Remote Commands

If the command code specifies a local/remote command, such as "Status of Local/Remote Modem" to be described later, test controller 101 causes the received command to be sent over the transmission line in the supervisory mode by means of a supervisory message, as in the case of a remote command/supervisory mode, but, pending receipt of the supervisory message containing the report from the addressed remote modem, executes the local command and loads the local report, DL, into report register 126. Upon receipt of said supervisory message, test controller 101 generates fields SB and L of the report message and loads both fields, together with the report, DR, from the addressed remote modem, into register 126. If the addressed remote modem fails to respond within the allotted time interval, field DR will contain an all-zero byte, in which case the report message in register 126 will have the following format:

F, A, N, L, K, I, AM, C, SB, DL, DR, FCS, F

This report message will then be transmitted to the DTE over line RD through SDLC adapter 128 and switch 132. For example, the command message that carries the "Status of Local/Remote Modem" type of local/remote command has the following format:

F, A, N, H, I, AM, '1A', FCS, F where command code '1A' specifies the command. This command is used to read the line quality parameters at the transmitting and receiving ends. The report message corresponding to this command has the following format:

F, A, N, L, K, I, AM, '1A', SB, DL, DR, FCS, F

Field DL, representing the report from the local modem, is comprised of four bytes, as noted below:
Byte 0:
    bits 0-5 Count of receive errors
    bit 6 Reinitialization of modem
    bit 7 Loss of carrier
Byte 1:
    bits 0-3 Quality of data
    bit 4 Detection of power-off condition of remote modem
    bit 5 Detection of power failure at remote modem
    bit 6 Switched network backup
    bit 7 Detection of streaming condition of remote modem
Byte 2:
    bit 0 Receive level off-specs
    bit 1 Data quality off-specs
    bits 2-7 Receive level
Byte 3:
    bit 0 Speed control mode
    bit 1 Contact closed
    bit 2 Second-level modem connected
    bit 3 Receive error off-specs
    bit 4 Non significant receive error
    bit 5 Non significant drop in data quality
    bit 6 Intervention necessary in the configuration bit 7 Loss of nonessential information Field DR, representing the report from the remote modem, is comprised of four bytes as noted below:

Byte 0:
    bits 0-5 Count of receive errors
    bit 6 Reinitialization of modem
    bit 7 Loss of carrier Byte 1:
    bits 0-3 Quality of data
    bit 4 0
    bit 5 0
    bit 6 Switched network backup
    bit 7 Detection of streaming condition at remote modem Byte 2:
    bit 0 Receive level off-specs
    bit 1 Data quality off-specs
    bits 2-7 Receive level Byte 3:
    bit 0 Speed control mode
    bit 1 Contact closed
    bit 2 Second-level modem connected
    bit 3 Receive level off-specs
    bit 4 Non significant receive error
    bit 5 Non significant drop in data quality
    bits 6-7 00

Commands Received From the Transmission Line

If the message recevied from the transmission line is a command message, encoder/decoder 136 sends a test request signal over line 178 to test controller 101 and transfers the received command message to input register 150 and supervisory message register 158. Upon detecting the test request signal, controller 101 reads out the content of register 150, activates line TI to inform the DTE to which it is attached that it is about to perform a test, and executes the command in register 150. If the command is a configuration command, it is transferred to configuration controller 102, which sends a report message to test controller 101. When the command has been executed, test controller 101 loads the result of the execution of the command, that is, the content of field DR of the report message, into register 152. The content of register 152 is then transferred to register 158, whose content is in turn sent over the transmission line in the supervisory mode of operation through SDLC adapter 108, switch 104, gate 106 and transmitter XMIT.

Figure 11B:
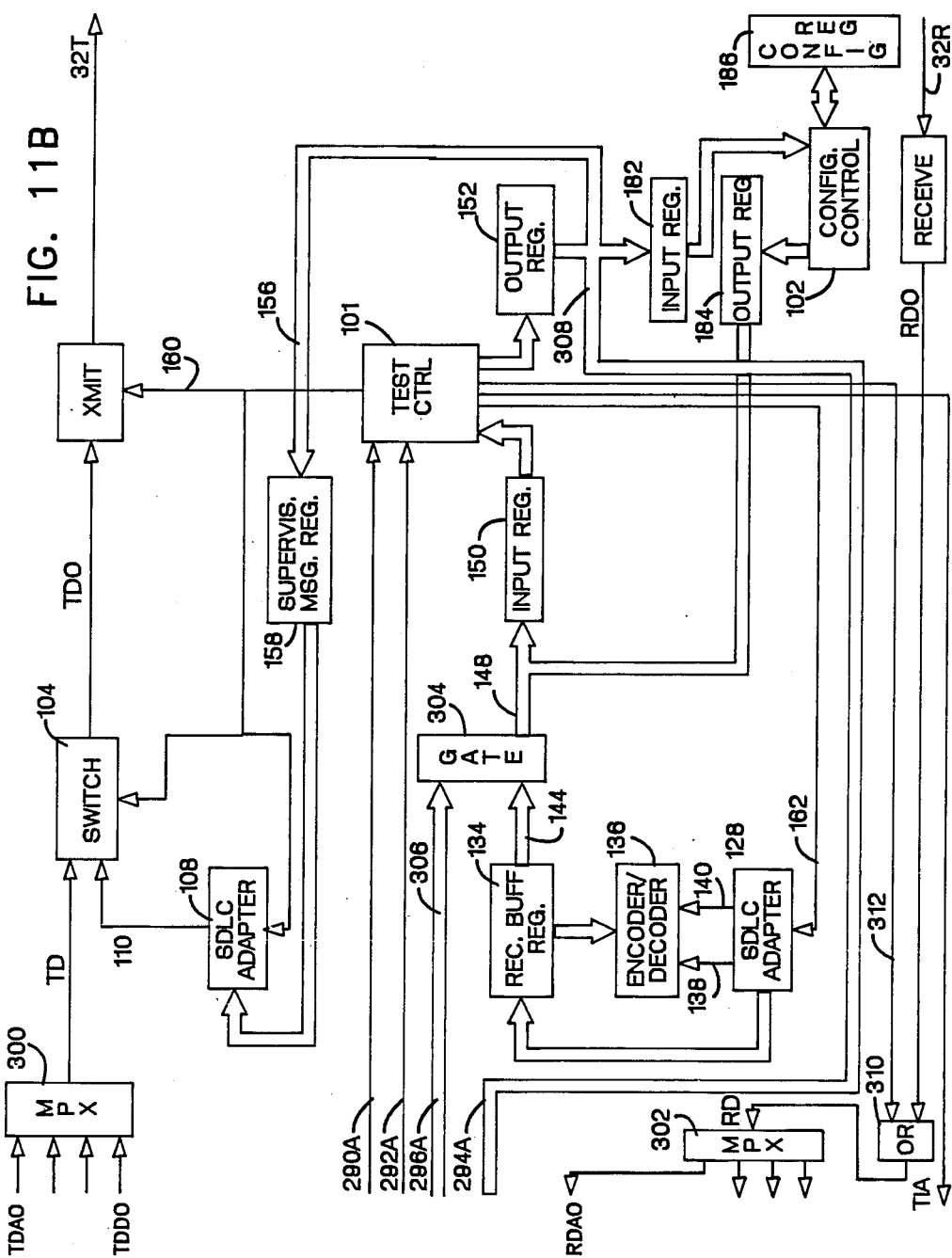
FIG. 11, consisting of FIGS. 11A and 11B, is a block diagram illustrating an exemplary embodiment of a modem incorporating the invention.

FIG. 11 shows an exemplary embodiment of a multichannel modem incorporating the invention. Only those elements necessary for a full understanding of the invention are illustrated. The modem shown comprises four channels A-D, a multiplexing/demultiplexing device DMPX consisting of multiplexers/demultiplexers MPX, and a base modem. Four channel test control interfaces 200A-200D are respectively associated with the four channels A-D. For simplicity, only one of these interfaces, 200A, is shown in detail in FIG. 11. Interface 200A has an input line TDA connected to as one input to a switch 204 whose output is applied as one input to an OR gate 206 which has its output applied as an input to the base modem over an output line TDAO of interface 200A. Input line TDA is also connected to the serial input of a SDLC adapter 208 which has its parallel input connected to a bus 212 and whose serial and parallel outputs are respectively connected to the other input of switch 204 and to a command buffer register 214. SDLC adapter 208 is similar to the SDLC adapters of FIG. 10. Buffer register 214 is coupled to an encoder/decoder 216 connected to SDLC adapter 208 via a validation line 218 and a non validation line 220 and which has an output connected to the other input of OR gate 206 via a line 222. Command buffer register 214 is connected via a bus 224 to a report buffer register 226 whose output is connected to the parallel input of a SDLC adapter 228 identical to SDLC adapter 208. The serial output of SDLC adapter 228 is connected to one of the two inputs of a switch 232 whose other input is connected to a line RDAO from the base modem and whose output is connected line RDA through an AND gate 233. Bus 224 is connected via a bus 248 to input register 250 of channel test controller 201, whose output register 252 has its output connected via a bus 254 to report register 226. Test controller 201 has an output connected via a line 260 to the control input of switch 204 and to the transmit mode control input of SDLC adapter 208, and has another output connected through a line 262 and an OR gate 264 to the transmit mode control input of SDLC adapter 228 and to the control input of switch 232. Encoder/decoder 216 has an output connected via a bus 268 to report register 226, and two other outputs respectively connected to the other input of OR gate 264 via a line 270 and to test controller 201 via a line 272. Test controller 201 is connected to the base modem via a modem test request line 290A and via a channel test request line 292A. Input register 250 and output register 252 are respectively connected to the base modem via buses 294A and 296A. Line TDAO and corresponding lines TDBO-TDDO of interfaces 200B-200D are connected to a multiplexer 300 whose output is connected to line TD of the base modem. Similarly, line RDAO and corresponding lines RDBO-RDDO of interfaces 200B-200D are connected to the outputs of a demultiplexer 302 whose input is connected to line RD of the base modem. The base modem and the modem of FIG. 10 have a number of elements in common. For simplicity, elements which are common to FIGS. 10 and 11 are assigned the same numerals. Line TD is connected to one of the two inputs of a switch 104 whose output is connected via a line TDO to the input of the transmitter XMIT of the base modem. The output of the receiver RCV of the base modem is connected via line RDO to the serial input of a SDLC adapter 128 whose parallel output is connected to a receive buffer register 134. The latter is coupled to an encoder/decoder 136 connected to SDLC adapter 128 via a validation line 138 and a non validation line 140. The output of buffer register 134 is connected via a bus 144 to the input of a gate 304 whose output is connected to input register 150 of test controller 101. The other input of gate 304 is connected via a bus 306 to bus 296A and to corresponding buses 296B-296D of interfaces 200B-200D. The output register 152 of test controller 101 has its output connected via a bus 156 to a supervisory message register 158 and via a bus 308 to bus 294A and to corresponding buses 294B-294D of interfaces 200B-200D. The output of register 158 is connected via a bus 112 to the parallel input of a SDLC adapter 108 which has its serial output connected to the other input of switch 104. Test controller 101 has an output connected to transmitter XMIT via a line 160, as well as to the control input of switch 104 and to the transmit mode control input of SDLC adapter 108. Test controller 101 has another output connected via a line 162 to the transmit mode control input of SDLC adapter 128, and is connected to lines 290A and 292A and to corresponding lines 290B-290D and 292B-292D of interfaces 200B-200D as well as to lines TIA-TID. Line RDO is connected to one of the two inputs of an OR gate 310 whose other input is connected via a line 312 to test controller 101 and whose output is connected to line RD. Output register 152 of test controller 101 is also connected to the input register 182 of a configuration controller 102 whose output register 184 is connected to input register 150 of test controller 101 and which is coupled to a configuration register 186. Test controller 101 is connected to a clock 188.

Commands Received From DTE

In the data mode of operation, the data bits sent over channel A by the DTE to which the modem is attached are conventionally applied to that modem via line TDA. The data bits are then fed through switch 204, gate 206 and line TDAO to multiplexer 300 where they are multiplexed together with the bits on channels B-D to form a composite train of bits that is fed to transmitter XMIT of the base modem to be sent over the transmission line. The data bits on line TDA are also fed to SDLC adapter 208 which operates in the receive mode unless a signal to the contrary has been generates. Upon detecting a start-of-frame delimiter, SDLC adapter 208 removes the extra zeros from the train of bits being received and loads the succesive bytes of remaining bits into command buffer register 214. Upon detecting a command header H in the train of bits being loaded in buffer register 214, encoder/decoder 214 waits for address field AM of the command message to be received and then decodes the address contained in that field. If this address is not that of the modem, the command message is ignored. If field AM does not contain the address of the modem, encoder/decoder 216 forces the output from OR gate 206 to a logical 1 value, thereby causing 1 bits to be transmitted over channel A, then waits for SDLC adapter 208 to determine whether the received command message is valid or invalid. In the latter case, SDLC adapter 208 supplies a high level over line 220 to encoder/decoder 216, which responds thereto by causing fields A, N, I, AM and C of the received command message stored in buffer register 214 to be transferred to predetermined positions of report register 226, and by then generating a detection byte SB specifying that the received command message is invalid and a byte L specifying the number of bytes in the report message, and loading said bytes SB and L into register 226. The report message in register 226 is then applied to SDLC adapter 228, which is set to the transmit mode by an appropriate signal supplied by encoder/decoder 216 over line 270 and which generates from the content of register 226 a SDLC frame that is sent to the DTE through line RDA and switch 232. If, on the other hand, the command message is found to be valid, SDLC adapter 208 supplies a high level over line 218 to encoder/decoder 216, which responds thereto by sending a test request signal to the test controller 201 of the channel over line 172 and by transferring fields A, N, I, AM and C of the command message stored in buffer register 214 to report register 226 and to input register 150 of test controller 101. Upon detecting ther test request signal, test controller 101 decodes command code C of the command message stored in input register 150. The command code may specify a local command, a remote command, or a local/remote command.

Local Commands

If the command code specifies a local command, the command may or may not relate to the base modem. In the latter case, test controller 201 causes the command specified by command code C to be executed and loads the result of the execution of the command, that is, the content of field D of the report message, into register 252. In addition, test controller 101 generates the contents of fields SB and L of the report message and loads them into register 252. The content of register 252 is then transferred to register 226. The report message contained in register 226 is then applied to SDLC adapter 228, which is set to the transmit mode by an appropriate signal supplied by test controller 101 over line 262 and which generates a SDLC frame from the content of report register 226. The SDLC frame is then sent to the DTE over line RDA through switch 232 and OR gate 233. If the command concerns the base modem, test controller 201 supplies a test request signal over line 290A and transfers the command to the test controller 101 of the base modem through its output register 252, bus 296A, bus 306, gate 304 and input register 150. Test controller 101 causes the command specified by command code C to be executed and stores the result of the execution of the command, that is, the content of field D of the report message, into output register 152. In addition, test controller generates the contents of fields SB and L of the report message and stores them in register 152. The content of register 152 is then transferred to test controller 201 via buses 308 and 294A to be loaded in its input register 250. Test controller 201 detects the report from the base modem and transfers it to report register 226. The report message in register 226 is then supplied to SDLC adapter 228, which is set to the transmit mode of operation by an appropriate signal sent over line 262 by test controller 201, and which derives a SDLC frame from the content of register 226. The SDLC frame is then sent to the DTE over line RDA through switch 232 and OR gate 233.

Remote Commands/Supervisory Mode

If the command code specifies a remote command to be transmitted in the supervisory mode of operation (with identifier bit 1(M) being zero), test controller 201 transfers the command received from the DTE to the test controller 201 of the base modem, as has been described. Upon detecting a remote command to be transmitted in the supervisory mode, test controller 101 causes the command message to be transferred from input register 150 to supervisory message register 158, and generates supervisory header SH and channel address CH, both of which it then loads in register 158 through its output register 152. Test controller 1091 sends a supervisory mode signal to transmitter XMIT over line 160. In response thereto, XMIT stops transmitting data over the line and starts transmitting a startup sequence TS, switch 104 interrupts all communications bertween line TD and XMIT, and SDLC adapter 108 is set to the transmit mode of operation. The supervisory message in register 158 is applied to SDLC adapter 108, which converts it into a SDLC frame. The SDLC frame is then applied through switch 104 to XMIT and transmitted at the rate of one bit per baud time. Test controller 101 initializes clock 188, which determines a specific time interval within which a report message is to be received from the remote modem, and takes the action described earlier if no such message is received before that time interval has elapsed. If the base modem receives a valid report message from the remote mode, encoder/decoder 136 decodes the message contained in receive buffer register 134. If it is a report message, the message is transferred to register 150 and controller 101 derives therefrom fields L, SB and DR, which are then loaded into register 152 and transferred to the buffer register 226 of the channel. The report message is next applied to SDLC adapter 228 which derives from the content of report register 226 a SDLC frame which it then transmits to the DTE over line RDA.

Remote Commands/Data Mode

If the command code specifies a remote command to be transmitted in the data mode of operation (with identifier bit 1(M) being one), test controller 201 causes the received command stored in buffer register 214 to be sent over line TDA through SDLC adapter 208, switch 204 and OR gate 206.

Commands Received From the Transmission Line

Signals received from the transmission line are applied to receiver RCV and conventionally converted into a train of bits that is demultiplexed by demultiplexer 302 for transmission to the DTE over lines RDA-RDD. Upon detecting a startup sequence among the signals received from the transmission line, receiver RCV goes to a receive rate of one bit per baud time at the end of the startup sequence. Upon detecting a start-of-frame delimiter, SDLC adapter 128, which operates in the receive mode unless a signal to the contrary has been generated, eliminates the extra zeros from the train of bits being received and loads the successive bytes of remaining bits in receive buffer register 134. After receiving a complete frame, encoder/decoder 136 decodes the address field, AM, of the message contained in buffer register 134. If field AM does not contain the address of the modem, the received message is ignored; if it does, encoder/decoder 136 waits for SDLC adapter 128 to determine whether the message is valid or invalid. In the latter case, test controller 101 generates the various report messages, as has been seen. If found to be valid, the message is transferred by encoder/decoder 136 to test controller 101. If the message happens to be a command message, the test controller determines whether it does or does not involve a channel (if it does, an address is specified in field CH). If it only concerns the base modem, the command is dealt with by the controller in the manner previously described. If the command relates to a channel, say, channel A, the controller activates test request line 292A and transfers the command to channel test controller 201, which executes the command and generates a report message which it then transmits to test controller 101. The latter derives therefrom a supervisory message which it then sends in the supervisory mode over the transmission line through SDLC adapter 108 and transmitter XMIT.

Control of Multiplexing Configurations

If the DTE desires to make changes in the multiplexing configuration, as by modifying the distribution and-/or speed of the active channels, it sends to the multichannel modem attached thereto, over any one of the channels, a command called Write Local Configuration as described below. The command message that carries this command has the following format:

F, A, N, H, I, AM, '26', CF, D, FCS, F where command code '26' specifies the command Write Local Configuration, field CF contains an 8-bit byte whose value is '44' (see the command Read Local Configuration, previously described), and field D is comprised of three bytes, as noted below:

Byte 0
  bits 0-3: 0000
  bits 4-7: Number of the external clock to be activated.
Byte 1 Number of the multiplexing configuration to be used at nominal speed.
Byte 2 Number of the multiplexing configuration to be used at backup speed.

When a channel detects this command, it transfers the command to the test controller 101 of the base modem, which identifies it and transfers it in its turn to configuration controller 102, or more precisely to the input register 182 thereof. The configuration controller compares the content of field D with that of configuration register 186 which specifies the number of the current multyiplexing configuration. If the contents of registers 182 and 186 match, no action is taken. If they do not, this means that a configuration change is being requested, and configuration controller 102 signals the fact to test controller 101, which sends the received command to the remote modem by means of a supervisory message transmitted in the supervisory mode and waits for the same supervisory message to be returned by the remote modem as an acknowledgment. If no such acknowledgment is received within a predetermined time interval, the modem may or may not retransmit the message from the DTE, as has been seen. If the acknowledgment is received before the allotted time interval has elapsed, the modem changes to the new configuration after a predetermined reaction time has elapsed.

What is claimed is:

1. A method of controlling a network of modems comprising link level cascaded pairs of primary and secondary modems, each pair being connected by a communication link level in a cascaded link communication system, said system comprising, a data terminal equipment (DTE), a first modem in communication with the data terminal equipment, and a second modem attached to the first modem through a given link level of a cascaded transmission medium, comprising steps of:
  transmitting a digital command message from the DTE to the first modem over the same path through which data is transmitted, said command message including a first digital identification means, a digital addressing means comprising a first segment containing the modem pair communication link level designation on which the desired modem resides and a second segment containing a constant for all primary modems or a second constant for all secondary modems or the address of the attached DTE for any secondary modem having an attached DTE, and a command means;
  monitoring said path at said first modem to detect said first identification means;
  monitoring said addressing means when said first identification means is detected; and
  storing said command message when said addressing means is detected to contain the address of said first modem; and
  decoding and acting on the command in said command means in said command message at said first modem.

2. A method as described in claim 1, further comprising steps of:
- reformatting at said first modem said digital command message to obtain a first digital supervisory message in which said first digital identification means is replaced by a second digital identification means when said digital command means specifies a command intended for a modem other than said first modem and;
- transmitting in succession over said given link levels of said transmission medium from said first modem a start-up sequence and said first digital supervisory message to said modem other than said first modem.

3. A method as described in claim 2, further comprising steps of:
- monitoring at said second modem the information being received to detect said second digital identification means;
- monitoring said digital addressing means when said second modem detects said first digital supervisory message to detect said second modem's address and;
- storing said first digital supervisory message when said digital addressing means in said digital supervisory message is detected to contain the address of said second modem and;
- executing the command specified by said command means included in said first digital supervisory message.

4. A system for controlling a network of modems comprising a DTE, a first modem attached to said DTE, at least a second modem connected to said first modem through a transmission medium comprising:
- means for generating a digital command message, said digital command message including a first digital identification means, a digital addressing means comprising a first segment containing the modem pair communication link level designation on which the desired modem resides and a second segment containing a constant for all primary modems or a second constant for all secondary modems or the address of the attached DTE for any secondary modem having an attached DTE, and a command means, said digital command message further including a digital addressing means comprising a first segment containing the modem pair communication link level designation of the modem to be addressed and a second segment containing a first constant for all primary modems or a second constant for all secondary modems or the DTE address for any secondary modem having a DTE attached thereto;
- and means for transmitting said digital command message to said first modem over the same path as that over which said first modem receives data from said DTE to be transmitted.

5. A system as described in claim 3 and further comprising:
- detection means at said first modem for monitoring said path and for intercepting a command message in response to the detection of said first digital identification means when said addressing means contains the address of said first modem.

6. A system as described in claim 4 further comprising means at said first modem for storing said command message;
- control means for decoding said command means in said command message and for generating a first digital supervisory message derived from said command message;
- means for replacing said first digital identification means with a second digital identification means when said digital command means contained in said first digital supervisory message specifies a digital command intended for said second modem and;
- means for transmitting over said transmission medium said first digital supervisory message to said second modem.

* * * * *